United States Patent [19] [11] 4,412,479
Ouwerkerk et al. [45] Nov. 1, 1983

[54] GAS FLOW ARRANGEMENT

[75] Inventors: Johannes H. W. Ouwerkerk, Driehuis; Albert Kramer, Enkhuizen; Johannes W. Mooij, IJmuiden, all of Netherlands

[73] Assignee: Estel Hoogovens B.V., Netherlands

[21] Appl. No.: 256,014

[22] Filed: Apr. 21, 1981

[30] Foreign Application Priority Data

May 8, 1980 [NL] Netherlands .......................... 8002639

[51] Int. Cl.³ ............................................ F24F 13/02
[52] U.S. Cl. ......................................... 98/36; 138/39; 239/590.3; 239/590.5
[58] Field of Search .......................... 239/590.3, 590.5; 138/37, 39, 42, 44, 94.3; 48/180 B; 98/36, 40 C

[56] References Cited

U.S. PATENT DOCUMENTS 3,437,415  4/1969  Davis et al. .................. 239/590.3 X
3,598,153  8/1971  Hayashi ................................. 138/37
3,673,946  7/1972  Ragland ........................... 138/37 X
4,213,766  7/1980  Wyatt ................................ 138/39 X
4,270,577  6/1981  Brown et al. .......................... 138/39
4,295,458  10/1981 Pellerin .......................... 48/180 B X

FOREIGN PATENT DOCUMENTS 94591  1/1963  Denmark ............................... 138/39

Primary Examiner—Albert J. Makay
Assistant Examiner—Harold Joyce
Attorney, Agent, or Firm—Stevens, Davis, Miller & Mosher

[57] ABSTRACT

To achieve uniform gas flow in a chamber to which gas is fed from a cylindrical pipe, the pipe has a closed end wall, at least two spaced rectangular apertures on one side near said end wall and, between each adjacent pair of apertures, a radial partition wall, having a central circular aperture. The arrangement is applicable to gas flow to a gas burner or a gas filter.

8 Claims, 5 Drawing Figures

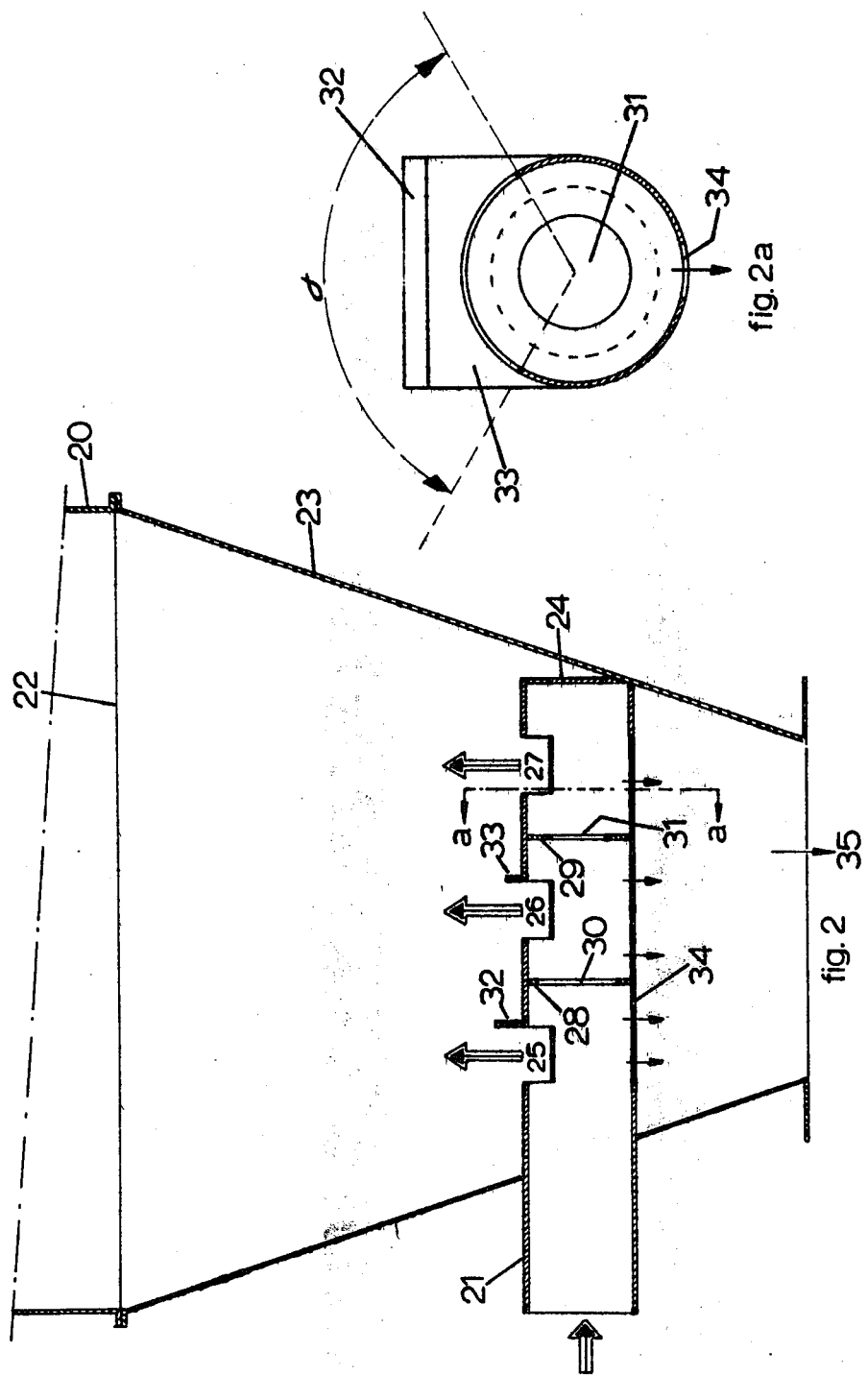

GAS FLOW ARRANGEMENT

BACKGROUND OF THE INVENTION

1. FIELD OF THE INVENTION

The present invention relates to a gas flow arrangement, in particular a connection between a cylindrical supply pipe and a chamber in which gas flow is generally at right angles to the axis of the pipe.

2. DESCRIPTION OF THE PRIOR ART

Certain gas handling structures require a flow of gas delivered through a round horizontal pipe to be deflected at right angles into a chamber of a different shape and caused to flow uniformly in a chamber. Hitherto, a compact and simple construction for this purpose has not been available. In order to reduce irregularities resulting from the flow mechanics of fluids, flow equalisers which have been available have been of relatively long or tall construction, e.g. with a length to diameter ratio of about 6 to 9. U.S. Pat. No. 3,831,350 shows a distributor of relatively complex construction.

Example of the use of such a flow equalizing construction may be in the flow of gas to a burner chamber or a filter housing, where it is desirable to have a rising flow of gas which is uniformly distributed over a horizontal section.

SUMMARY OF THE INVENTION

The object of the present invention is to provide a gas flow arrangement of this kind which is effective and yet is simple and compact.

The invention as claimed is intended to provide a solution. With the arrangement of the invention it seems possible to achieve a uniformly distributed flow of gas over a particular cross sectional area. The invention is applicable to constructions in which the supply pipe and the flow chamber are in any orientation, though it is principally described here in relation to the case where the pipe is horizontal and flow in the chamber is vertically upwards.

GB No. 1,197,025 describes a pipe system for gas with a number of outlet apertures of equal shape and dimensions at a number of different positions along the length of a round horizontal pipe, with supply pipes to various separate burners being connected to these apertures. Local constrictions are made in the horizontal pipe after each of these apertures with the exception of the last aperture, and these constrictions become successively narrower in the direction of flow.

However, here, the constrictions in each case are of much greater length than the spacing between the individual outlet apertures. Furthermore, this known arrangement is concerned solely with a uniform distribution of the gas via the separate delivery lines, and not with a uniform flow in one chamber as may be achieved in the present invention.

BRIEF INTRODUCTION OF THE DRAWINGS

Preferred embodiments of the invention will now be described by way of non limitative example and with reference to the accompanying drawings, in which:

FIG. 1 is a perspective partly cut away view of an embodiment of the present invention, designed to be fitted to a burner chamber located above it, FIGS. 1a and 1b are respectively two vertical cross sectional views of the arrangement of FIG. 1, FIG. 2 is a cross sectional view of a second embodiment of the present invention designed to be used beneath a filter housing, and FIG. 2a is a sectional detail on the line a—a of FIG. 2, drawn on a slightly larger scale.

DESCRIPTION OF THE PREFERRED EMBODIMENTS

Figure 1:
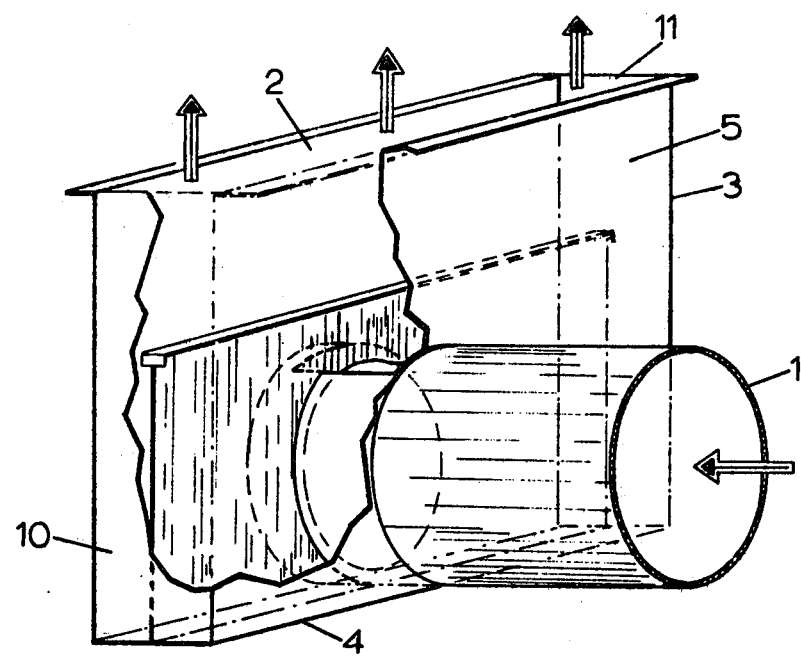
Figures 1A, 1B:
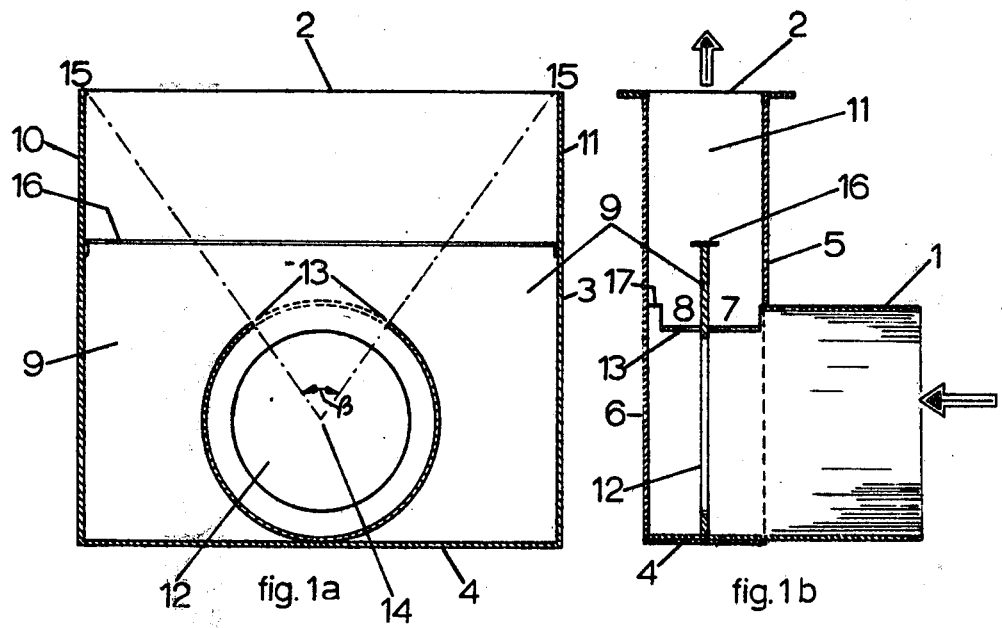

FIGS. 1, 1a and 1b show a cylindrical horizontal supply pipe 1 for an inflammable gas, the flow of which is deflected at the connection illustrated so that at the horizontal plane 2 (described further below), there is a uniformly distributed flow of gas rising and entering a burner chamber (not shown) to be fitted on top of the structure shown. The structure comprises a flow chamber formed by a casing 3 which is rectangular and is open at the top at the level of the plane 2. The pipe 1 enters the casing 3 at the centre of the front wall 5 of the casing 3 close to the base 4 of the casing 3, and is closed by the rear wall 6 opposite. In FIG. 1—in order to give a clearer view of the inside of the casing—part of the front wall 5 and one side wall 10 has been cut away.

Inside the casing 3, the pipe 1 has two transverse rectangular apertures 7, 8 in its top side, close to the end wall 6. By rectangular apertures, we mean apertures having four edges, two of which are parallel and lie in radial planes and the other two of which are parallel and lie in axial planes. Between these apertures 7,8 is a vertical partition 9 of rectangular shape extending between the two narrow side walls 10, 11 of the casing 3. Inside the pipe 1 this partition forms a flow constricting wall and in this wall is a circular aperture 12 concentric with the wall of the pipe, the cross sectional area of this aperture being in this case about half of the cross sectional area of the pipe.

The circumferential edges 13 of the rectangular apertures 7 and 8 lie in the wall of the pipe (i.e. the edges in radial planes) are positioned so that they lie approximately in planes connecting the axis 14 of the pipe 1 and the edges 15 where the cross sectional plane 2 meets the narrow side walls 10 and 11. The angle between these lines is represented by $\beta$.

The vertical partition 9 divides the inside of the casing 3 into parts of equal size. The top edge of the partition 9 is preferably provided with a horizontally projecting strip 16. The widths of the apertures 7 and 8 do not have to be precisely equal; in general, the aperture 8 which is closest to the closed end of the pipe (or rear wall 6) is preferably slightly narrower. The most suitable width of the narrow strip 17 between this aperture 8 and the end wall 6 can be determined empirically.

With this arrangement an upward flow distributed evenly over the whole area of the chamber 3 at the plane 2 appears to be achieved in a simple manner, with the height of the structure being particularly small, as is demonstrated by the following example of relative dimensions:

internal diameter of pipe = D
diameter of aperture $12 = \frac{1}{2}\sqrt{2}D = 0.707\ D$
cross-sectional area of outlet $2 = 2D \times \frac{1}{2}\ D = D^2$
height of partition $9 = 1.2\ D$
angle $\beta = 60°$
height of casing 3 (between surface 2 and base (4)) $= \frac{1}{2}D + D\sqrt{3}$ Another application of the invention is to gas filters. With an existing filter housing, the arrangement of the present invention has to be adapted to the existing structure. A casing in the form of an inverted truncated pyramid is connected at its open top side to the filter housing, and acts as a dust collector cone. In existing bag filters, for example, the filter bags which are generally most upstream of the gas flow, are exposed to extreme loads as a result of the powerful upward flow of dust-saturated gas and consequently have a shorter service life than the other bags. Repeated shutdowns of the filter to replace or repair damaged bags is a costly affair. To ensure more even wear on the filter bags it is important to equalise the flow of dust-saturated gas so that the filter can be kept in operation longer.

FIG. 2 illustrates this application of the invention and shows part of a filter housing 20, in which, for example, filter bags (not illustrated) are suspended. In these filter bags, gas saturated with dust, particularly air, which is delivered at a speed of about 15 m/s through a cylindrical horizontal pipe 21, is filtered. In order to achieve a uniform distribution of gas at the level of the rectangular plane 22, the arrangement of the present invention is installed at the connection of the pipe 21 to the dust collector funnel 23 (which as stated above is in the form of an inverted truncated pyramid) beneath the filter housing.

The end 24 of the pipe 21 is closed and there are three transverse rectangular (as defined above) apertures 25, 26, 27 in the top of the pipe, distributed over the length of the pipe in the funnel 23.

The circumferential edges of the rectangular apertures 25, 26 27 can be seen in FIG. 2a. They subtend an angle $\gamma$ at the pipe axis. This angle $\gamma$ is larger than the angle $\beta$ in FIG. 1a because of the sloping walls of the dust collector funnel 23. In practice $\gamma$ is between 100° and 120°.

Partitions 28,29 are fitted in the pipe between each adjacent pair of these apertures and each partition is provided with a concentric circular aperture 30,31. The diameter of aperture 30 is approximately $\sqrt{\frac{2}{3}} \times D$, where D is the internal diameter of the pipe, and the diameter of aperture 31 is roughly $\sqrt{\frac{1}{3}} \times D$.

Vertical partitions 32, 33 each of the same width as the pipe 21, are fitted to the pipe at the rear edge of the two foremost apertures 25 and 26, the first partition 32 being higher than second partition 33, as shown in FIG. 2a.

In order to remove dust deposited in the pipe 21, an axially extending slit shaped opening 34 is made in the underside of the pipe. Dust collected by the filter bags is removed from the funnel 23 at 35 in a known manner which need not be further described here.

What is claimed is:

1. In a gas flow arrangement in which gas flowing axially along a cylindrical pipe is directed into a flow chamber having a gas exit at one side thereof and communicating with said pipe at right angles to the axis of said pipe in which the gas flow is generally at right angles to the flow in the pipe, the improvement that:
in order to achieve a highly uniform flow at a given cross sectional area transverse to the flow in said flow chamber the pipe is closed by an end wall and has, at one side thereof and close to said end wall, at least two mutually axially spaced apertures opening into said flow chamber for flow of gas from the pipe into the chamber toward said exit, each of said apertures having four edges located in planes radial to and at right angles to the axis of said pipe, and there being, in the pipe between each axially adjacent pair of said apertures, a flow constricting partition wall having through it a circular apertures concentric with the pipe axis.

2. An arrangement according to claim 1 wherein said flow chamber has rectangular top, base and sides and is open at its top into a burner chamber, the said cylindrical pipe extending horizontally and passing into said flow chamber centrally through one of said sides at or close to said base, there being two of said apertures in the pipe and each of said apertures having a pair of opposed edges which are respectively located substantially at two planes respectively connecting the pipe axis with opposite edges of said open top of the flow chamber.

3. Arrangement according to claim 2 wherein the flow-constricting partition wall extends into the flow chamber outside the pipe and has a horizontal top edge which carries a horizontally projecting strip.

4. Arrangement according to claim 2 or 3 wherein a narrow pipe wall portion extends between the pipe end wall and the aperture nearer the end wall.

5. Arrangement according to claim 1 wherein said flow chamber has an inverted truncated pyramid shape and has an open top leading into a filter housing, the cylindrical pipe extending horizontally and passing centrally through a side wall of said chamber, there being three of said apertures for flow of gas into said chamber and two of said flow constricting partition walls respectively between the adjacent pairs of the apertures.

6. Arrangement according to claim 5 including first and second upstanding walls outside the pipe at the rear edge in the axial direction of flow along the pipe of each of the first two apertures in said axial direction of flow, the width of the upstanding walls being equal to the pipe diameter and the first said upstanding wall in said axial direction of flow being taller than the second said upstanding wall.

7. Arrangement according to claim 5 or 6 wherein, within said chamber, the pipe has an axially extending slit-shaped aperture in its underside.

8. A gas flow connection comprising:
a cylindrical pipe having an axis, in which in use gas flow is generally axial,
a flow chamber communicating with said pipe at right angles to the axis thereof having a gas exit at one side thereof and in which in use gas flow is generally at right angles to said axis,
at least two mutually axially spaced apertures in said pipe at one side thereof opening into said chamber for gas flow from said pipe into said chamber in the direction of said exit, each said aperture having two parallel opposed edges lying in respective planes at right angles to the axis of said pipe and two parallel opposed edges lying in respective radial planes,
an end wall closing said pipe downstream of said apertures, and
in said pipe between each axially adjacent pair of said apertures, a flow constricting radial partition wall having a central circular aperture concentric with said axis.

* * * * *